United States Patent
Zheng et al.

(10) Patent No.: US 8,139,770 B2
(45) Date of Patent: Mar. 20, 2012

(54) CRYPTOGRAPHIC KEY BACKUP AND ESCROW SYSTEM

(75) Inventors: Yuliang Zheng, Charlotte, NC (US); Neil Kevin Kauer, Belmont, NC (US); David Victor Badia, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1972 days.

(21) Appl. No.: 11/019,069

(22) Filed: Dec. 21, 2004

(65) Prior Publication Data
US 2005/0138374 A1    Jun. 23, 2005

Related U.S. Application Data

(60) Provisional application No. 60/531,694, filed on Dec. 23, 2003.

(51) Int. Cl.
H04L 29/06    (2006.01)
(52) U.S. Cl. .................. 380/286; 380/277; 380/278
(58) Field of Classification Search .......... 380/286
See application file for complete search history.

(56) References Cited

U.S. PATENT DOCUMENTS

| | | | |
|---|---|---|---|
| 4,941,176 A * | 7/1990 | Matyas et al. | 380/280 |
| 5,200,999 A | 4/1993 | Matyas et al. | |
| 5,604,801 A | 2/1997 | Dolan et al. | |
| 5,841,865 A | 11/1998 | Sudia | |
| 6,035,402 A | 3/2000 | Vaeth et al. | |
| 6,393,563 B1 | 5/2002 | Maruyama et al. | |
| 6,530,020 B1 | 3/2003 | Aoki | |
| 6,636,968 B1 | 10/2003 | Rosner et al. | |
| 6,748,528 B1 | 6/2004 | Greenfield | |
| 6,760,441 B1 * | 7/2004 | Ellison et al. | 380/45 |
| 6,802,002 B1 | 10/2004 | Corella | |
| 6,834,112 B1 | 12/2004 | Brickell | |
| 6,880,081 B1 | 4/2005 | Itkis | |
| 6,904,524 B1 | 6/2005 | Jaeger, Jr. et al. | |
| 6,915,434 B1 | 7/2005 | Kuroda et al. | |
| 7,093,133 B2 | 8/2006 | Hopkins et al. | |
| 2001/0026619 A1 | 10/2001 | Howard, Jr. et al. | |
| 2001/0034836 A1 | 10/2001 | Matsumoto et al. | |
| 2002/0018570 A1 | 2/2002 | Hansmann et al. | |
| 2002/0026575 A1 | 2/2002 | Wheeler et al. | |
| 2002/0071561 A1 | 6/2002 | Kurn et al. | |
| 2002/0078355 A1 | 6/2002 | Samar | |
| 2002/0120840 A1 | 8/2002 | Yellepeddy et al. | |
| 2002/0144109 A1 | 10/2002 | Benantar et al. | |
| 2002/0154782 A1 | 10/2002 | Chow et al. | |
| 2003/0076959 A1 | 4/2003 | Chui | |

(Continued)

FOREIGN PATENT DOCUMENTS

WO    2005062919 A3    7/2005

(Continued)

*Primary Examiner* — Kim Vu
*Assistant Examiner* — Randal Moran
(74) *Attorney, Agent, or Firm* — K&L Gates LLP

(57) ABSTRACT

A system for securely storing application keys is comprised of a database system, a peripheral hardware security module and cryptographic keys, wherein cryptographic keys comprise application keys, intermediate keys and a master key. Application keys are grouped according to characteristic and are associated with a particular intermediate key, which is utilized to scramble and descramble application keys within the associated group. Intermediate keys are associated with the master key, which is utilized to scramble and descramble the intermediate keys. Scrambling and descrambling of keys is performed within the peripheral hardware security module.

29 Claims, 11 Drawing Sheets

U.S. PATENT DOCUMENTS

| | | |
|---|---|---|
| 2003/0081789 A1 | 5/2003 | Numao et al. |
| 2003/0138105 A1* | 7/2003 | Challener et al. ............. 380/277 |
| 2003/0154376 A1 | 8/2003 | Hwangbo |
| 2003/0163700 A1 | 8/2003 | Paatero |
| 2003/0237004 A1 | 12/2003 | Okamura |
| 2004/0001595 A1 | 1/2004 | Hopkins et al. |
| 2004/0039925 A1 | 2/2004 | McMillan et al. |
| 2004/0054913 A1 | 3/2004 | West |
| 2004/0068650 A1 | 4/2004 | Resnitzky et al. |
| 2004/0109567 A1 | 6/2004 | Yang et al. |
| 2004/0109568 A1 | 6/2004 | Slick et al. |
| 2004/0151317 A1 | 8/2004 | Hyyppa et al. |
| 2004/0151319 A1* | 8/2004 | Proudler ....................... 380/277 |
| 2005/0069136 A1 | 3/2005 | Thornton et al. |
| 2005/0097316 A1 | 5/2005 | Kim |
| 2005/0114689 A1 | 5/2005 | Strom et al. |
| 2005/0138374 A1 | 6/2005 | Zheng et al. |
| 2005/0152542 A1 | 7/2005 | Zheng et al. |
| 2006/0004792 A1* | 1/2006 | Lyle et al. ..................... 707/100 |
| 2007/0230704 A1 | 10/2007 | Youn et al. |
| 2008/0016357 A1 | 1/2008 | Suarez |
| 2008/0181408 A1 | 7/2008 | Hird |

FOREIGN PATENT DOCUMENTS

| | | |
|---|---|---|
| WO | 2007002691 A3 | 1/2007 |

* cited by examiner

CRYPTOGRAPHIC KEY BACKUP AND ESCROW SYSTEM

CROSS-REFERENCE TO RELATED APPLICATION

This application is entitled to the benefit of, and claims priority to provisional U.S. patent application Ser. No. 60/531,694 filed Dec. 23, 2003, the entirety of which is incorporated herein by reference.

FIELD OF THE INVENTION

The present invention relates to a system and a method for securely storing and accessing computer-generated application keys.

BACKGROUND OF THE INVENTION

Businesses and individuals are increasingly dependent on computers and computer-based electronic communication. More and more businesses are moving toward "paperless" modes of operation, and the convenience of the Internet has resulted in individuals using electronic media for various activities, such as communicating via email, banking, paying bills, investing money and shopping, to name but a few. While businesses and individuals desire the convenience of electronic communication, these entities also want to maintain at least the same level of security that more traditional methods of communication offer. However, in some ways, more traditional methods of communication are inherently more secure than electronic communication because of the relative ease with which computers may be used to intercept the information being communicated between two or more other computers. Accordingly, techniques have been created to secure information being communicated electronically.

Many of these techniques make use of various aspects of cryptography. Cryptography is the study of sending messages in a secret form so that only those authorized to receive the message be are able to read it. Cryptography may be used for any form of communication, but for the purposes of this application, cryptography for electronic communication will be discussed. For electronic communication, a message is transformed into a secret form using a cryptographic key and then may be transformed back into its original or clear form with a cryptographic key. Examples of cryptographic techniques include symmetric encryption, asymmetric encryption and hashing.

A networked computer system using more than one cryptographic technique provides a greater level of security for the information being stored and communicated by the system. Security may be further improved by utilizing different keys with different applications. However, a system with multiple users and applications, using multiple cryptographic techniques to protect multiple messages and pieces of information, results in a large volume of application keys being generated and utilized to protect information. Managing these keys in a secure manner presents many challenges. One particular challenge is to store the keys in a secure yet accessible manner for backup and escrow purposes.

In one known approach to storing application keys for the above-referenced purposes, keys are stored in a multi-layer system. Although such a system may have varying numbers of levels, an example of a four layer system will be described for purposes of illustration. The lowest layer, or layer one, stores the application keys in scrambled form. The next layer, or layer two, generally holds an additional set of keys used to scramble and descramble the keys in layer one. These keys are also in scrambled form. Typically, in a system of this type, each key at layer two is used to scramble more than one of the application keys stored at layer one. In this manner, there are fewer keys at layer two than there are keys at layer one. The keys in layer two are scrambled and descrambled using a single master key, which is stored in layer three. The key in layer three is in clear form. Layer four is the outside layer of protection. Layer four comprises a password protection, meaning a user simply enters a password in order to access the key at layer three. In such a system, everything is thus ultimately being protected by a password.

Known approaches, such as the outlined above, also suffer from a number of additional drawbacks. For example, the approach outlined above provides multiple levels of protection but merely shifts the area of vulnerability from the lowest layer to the highest layer, which in this case is a single password. Because passwords are typically given relatively low levels of protection, this is relatively undesirable.

Further, as set forth above, each key at layer two is used to scramble more than one application key at layer one. Typically, application keys are scrambled according to the layer two key that is currently in use. If the layer two key is replaced, then subsequent application keys are scrambled using the new layer two key. Previously-generated application keys, however, are not descrambled; instead, they remain scrambled using the layer two key that was in effect when they were created. This has the effect of grouping the application keys on the basis of the time that each key was created. Unfortunately, this approach, while reducing the number of keys needed at level two, provides no flexibility for placing application keys into groups.

Still further, in the storage approach set forth above, the scrambling process includes hashing the keys first and then encrypting the keys. Unfortunately, this scrambling process requires that a key be decrypted in order to verify the integrity of the key. This is a drawback because it results in a key being in clear form and therefore being at risk in order to verify that it has not been comprised. In addition, decrypting an entire key merely to provide integrity verification consumes valuable processing time.

Thus, in order to solve the above-described problems and other issues inherent in prior art systems and approaches, it is desirable to provide a key storage system and method that offers greater and more diverse protection than known systems.

SUMMARY OF THE INVENTION

Broadly defined, the present invention according to one aspect is a method, in a networked computer system, for verifying an encrypted cryptographic key, including: providing a lower-level cryptographic key; providing a higher-level cryptographic key having an encryption portion and a verification portion; utilizing the encryption portion of the higher-level cryptographic key to encrypt the lower-level cryptographic key; utilizing the verification portion of the higher-level cryptographic key to generate a verification tag for storing with the encrypted lower-level cryptographic key; and utilizing the verification portion of the higher-level cryptographic key to verify the integrity of the encrypted lower-level cryptographic key by examining the verification tag stored with the encrypted lower-level cryptographic key.

In features of this aspect, the lower-level cryptographic key may be an application key and the higher-level cryptographic key may be an intermediate key; the intermediate key may be encrypted with a master key; the lower-level cryptographic key may be an intermediate key and the higher-level cryptographic key may be a master key; the intermediate key may be utilized to encrypt an application key; the intermediate key includes a verification portion and an encryption portion; and the lower-level cryptographic key may not be decrypted during the verifying step.

The present invention according to a second aspect is a method, in a key management system, of accessing at least a portion of an encrypted cryptographic key, including: providing a lower-level cryptographic key and a higher-level cryptographic key, at least the lower-level cryptographic key having an encryption portion and a verification portion; utilizing at least a first portion of the higher-level cryptographic key to encrypt the encryption portion and verification portion of the lower-level cryptographic key, wherein the encryption portion is encrypted independently of the verification portion; and utilizing the at least first portion of the higher-level cryptographic key to decrypt the encrypted verification portion of the lower-level cryptographic key independently of decrypting the encrypted encryption portion of the lower-level cryptographic key.

In features of this aspect, the lower-level cryptographic key may be an intermediate key and the higher-level cryptographic key may be a master key; the encrypted encryption portion of the lower-level cryptographic key may be decrypted at a substantially different time than the encrypted verification portion of the lower-level cryptographic key is decrypted; the encrypted verification portion of the lower-level cryptographic key may be decrypted in order to generate a verification tag for an application key; the encrypted verification portion of the lower-level cryptographic key may be decrypted in order to verify the integrity of an application key; the encrypted verification portion of the lower-level cryptographic key may be decrypted at a substantially different time than the encrypted encryption portion of the lower-level cryptographic key is decrypted; the encrypted encryption portion of the lower-level cryptographic key may be decrypted in order to encrypt an application key; the encrypted encryption portion of the lower-level cryptographic key may be decrypted in order to decrypt an application key; the steps may be repeated cyclically as a part of a user-defined integrity management process; the verification portion of the lower-level cryptographic key may be accessed on a more frequent schedule than is the encryption portion of the lower-level cryptographic key; the higher-level cryptographic key may have an encryption portion and a verification portion; and the method may include utilizing the verification portion of the higher-level cryptographic key to generate a verification tag for storing with the encrypted lower-level cryptographic key, and utilizing the verification portion of the higher-level cryptographic key to verify the integrity of the encrypted lower-level cryptographic key by examining the verification tag of the encrypted lower-level cryptographic key prior to decrypting any portion of the encrypted lower-level cryptographic key.

The present invention according to a third aspect is a method, in a networked computer system, for managing stored cryptographic keys, including: receiving a plurality of lower-level cryptographic keys and higher-level cryptographic keys and storing them in a database system; in the database system, organizing the lower-level cryptographic keys into groups according to a defined characteristic; after organizing the keys, receiving a new lower-level cryptographic key and sorting the new lower-level cryptographic key into groups according to a corresponding characteristic of the new lower-level cryptographic key; and designating a separate higher-level cryptographic key for performing scrambling and descrambling processes on lower-level cryptographic keys within each group.

In features of this aspect, the number of lower-level cryptographic keys may be independent of the number of higher-level cryptographic keys; the lower-level cryptographic keys and higher-level cryptographic keys may be refreshed cyclically; the method may further include refreshing the selected higher-level cryptographic key, decrypting all lower-level cryptographic keys in the group associated with the selected higher-level cryptographic key and re-encrypting the lower-level cryptographic keys in the associated group with the new higher-level cryptographic key without altering the clear forms of the lower-level cryptographic keys in the associated group; the lower-level cryptographic keys may be refreshed independently of the higher-level cryptographic keys; the defined grouping characteristic for lower-level cryptographic keys may be the encryption algorithm for which a lower-level cryptographic key is utilized; and the defined grouping characteristic for lower-level cryptographic keys may be the business unit for which a lower-level cryptographic key is utilized.

The present invention according to a fourth aspect is a method, in a networked computer system, for managing and maintaining security of cryptographic keys, including: providing a lower-level cryptographic key and a higher-level cryptographic key; utilizing the higher-level cryptographic key to encrypt the lower-level cryptographic key; and rotating the higher-level cryptographic key, wherein rotating includes refreshing the higher-level cryptographic key, decrypting the lower-level cryptographic key with the higher-level cryptographic key and re-encrypting the lower-level cryptographic key with the new higher-level cryptographic key without altering the clear form of the lower-level cryptographic key.

In features of this aspect, the lower-level cryptographic key may be an application key and the higher-level cryptographic key may be an intermediate key; the lower-level cryptographic key may be an intermediate key and the higher-level cryptographic key may be a master key; the lower-level cryptographic key may be a first intermediate key and the higher-level cryptographic key may be a second intermediate key; and the higher-level cryptographic key may be automatically rotated cyclically.

The present invention according to a fifth aspect is a secure key escrow system for application keys within a networked computer system, including: a collection of key data which includes a plurality of application keys for use in facilitating secure communication in the networked computer system, at least one level of intermediate keys and a master key, wherein each application key is encrypted using a key from the lowest of the at least one level of intermediate keys, and each key in the highest of the at least one level of intermediate keys is encrypted using the master key; a cryptographic key database system that stores the encrypted application keys and each key from at least the lowest level of intermediate keys; a server computer communicatively connected into the networked computer system and arranged to provide application keys from the database system to other computers in the networked computer system; and a peripheral hardware security module communicatively connected to the server computer that encrypts each application key using a key from the lowest level of the at least one level of intermediate keys and encrypts each intermediate key from the highest level of the at least one level of intermediate keys with the master key.

In features of this aspect, there may be one key at each level of the at least one level of intermediate keys; the lowest level of the at least one level of intermediate keys and the highest level of the at least one level of intermediate keys may be the same level; there may be one key at each level of the at least one level of intermediate keys; the database system may include a first database housing the encrypted application keys and each key from at least the lowest level of intermediate keys, and a second database mirroring the first database; the system may further include a second peripheral hardware security module adapted to perform the same functionality as the first peripheral hardware security module and using the same master key for backup; the collection of key data may include a separate verification tag associated with each encrypted application key and encrypted intermediate key, each separate verification tag associated with an encrypted application key being generated using a key from the lowest of the at least one level of intermediate keys, each separate verification tag associated with an intermediate key in the highest of the at least one level of intermediate keys being generated using the master key; the system may further include a plurality of master key shares, the plurality of master key shares being generated by mathematically splitting the master key; each master key share may be stored on a portable device; and each portable device may be password protected.

The present invention according to a sixth aspect is a method for operating a secure key escrow system for application keys within a networked computer system, including: collecting key data, the key data including a plurality of application keys for use in facilitating secure communication in the networked computer system, at least one level of intermediate keys and a master key, wherein each application key is encrypted using a key from the lowest of the at least one level of intermediate keys, and each key in the highest of the at least one level of intermediate keys is encrypted using the master key; utilizing a cryptographic key database system to store encrypted application keys and each key from at least the lowest level of intermediate keys in; utilizing a server computer communicatively connected with the networked computer system to provide application keys from the database system to other computers in the networked computer system; and utilizing a peripheral hardware security module communicatively connected to the server computer to encrypt each application key using a key from the lowest level of the at least one level of intermediate keys and encrypting each intermediate key from the highest level of the at least one level of intermediate keys with the master key.

In features of this aspect, the method may further includes utilizing a mathematical algorithm to split the master key into a plurality of master key shares; the method may further include storing each master key share on a portable device and distributing each portable device to an entity; the method may further include utilizing the peripheral hardware security module to reconstruct the master key from the plurality of master key shares; and less than all of the plurality of master key shares may be utilized to reconstruct the master key.

Further areas of applicability of the present invention will become apparent from the detailed description provided hereinafter. It should be understood that the detailed description and specific examples, while indicating an embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF EMBODIMENTS

Figure 1:
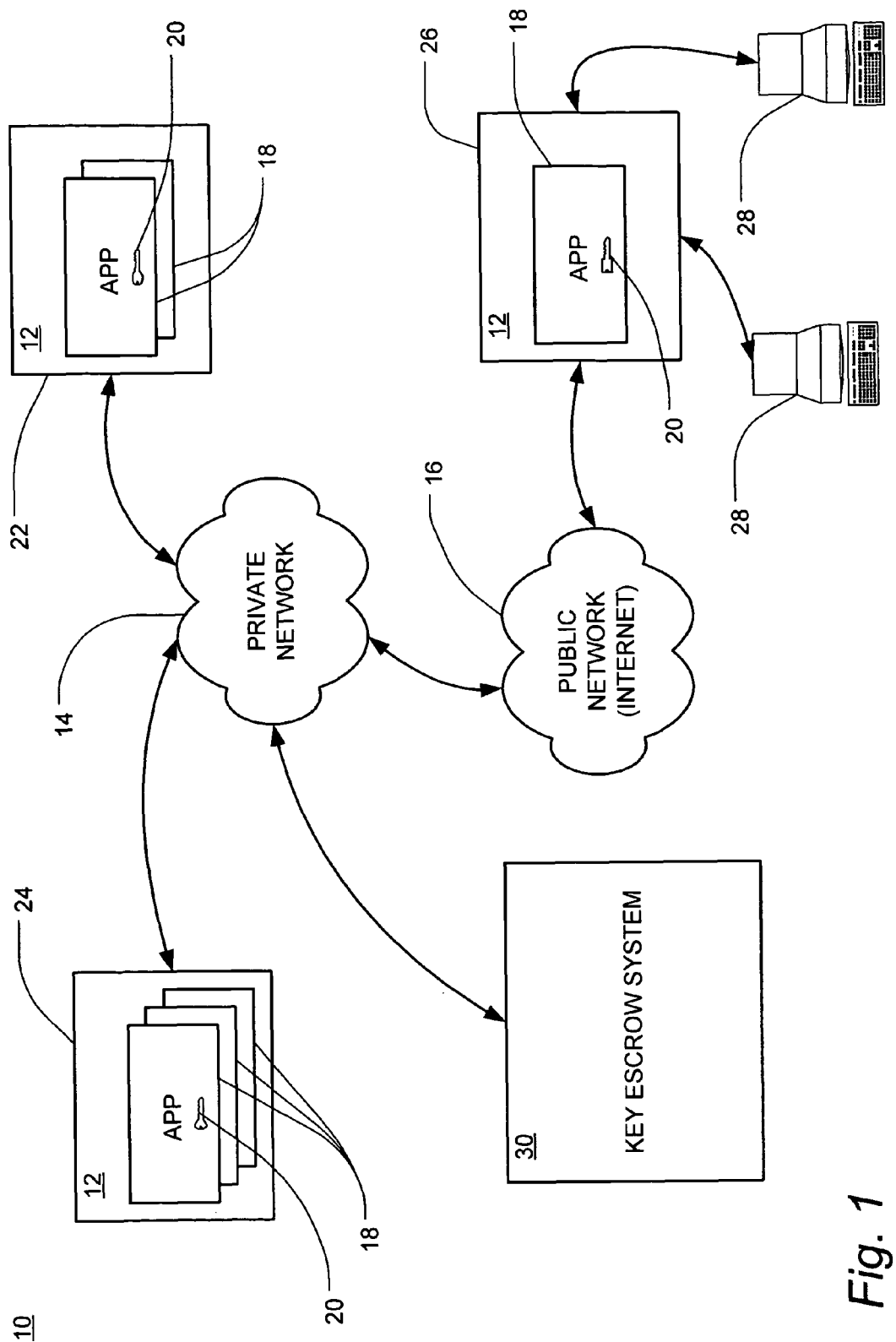
FIG. 1 is a depiction of an exemplary networked computer system.

The following description of the embodiments of the present invention is merely exemplary in nature and is in no way intended to limit the invention, its application, or uses. The present invention has broad potential application and utility, which is contemplated to be adaptable to a wide range of entities for securing and managing storage and access to application keys within an entity's networked computer system. For example, it is contemplated that the key backup and escrow system and method would be beneficial for use by any bank that provides online banking services, such as statement review, bill paying and/or investing, to its customers. Additionally, it is contemplated that the system and method of the present invention would be equally beneficial to be used for key escrow by any retail business that provides online retail services. Further, the system and method of the present invention would be beneficial to any business using computers to store, access, process or use information, particularly if that business uses an intranet for communication between multiple locations. The following description is provided herein solely by way of example for purposes of providing an enabling disclosure of the invention, but does not limit the scope or substance of the invention.

Briefly summarized, a networked computer system 10 may offer or make available multiple applications 18 distributed across multiple devices, such as servers 12, in the system 10. Users access applications 18 in other servers 12 in order to perform a function, access information or the like. In order for one server 12 to utilize an application on another server 12, the servers 12 must be able to communicate with each other. This communication is facilitated through the use of one or more keys, which are known as application keys 18. Therefore, application keys are a means of protection for a networked computer system; i.e., without an application key, one server 12 will be unable to access a particular application 18 on another server 12 within the networked computer system 10. Accordingly, in order to protect a networked computer system 10, the application keys 18 used therein must be protected. An aspect of protecting application keys 18 is storing reference copies of them in a secure manner for future key restoration, e.g., in disaster recovery scenarios.

Referring now to the accompanying drawings, FIG. 1 depicts an exemplary networked computer system 10. In the networked computer system 10, various applications 18 are located on servers 12, which may be connected to one another via a private network 14 and/or a public network 16, which is typically the Internet. As is depicted in FIG. 1, servers 12 may include a distributed server 24, a mainframe 22 and/or an Internet service provider (ISP) 26. As described above, the applications 18 utilize application keys 20 for facilitating secure communication. In order to store the application keys 20 for reference and, if necessary, restoration, such as through a recovery process, the networked computer system 10 further includes a key escrow system 30. The security methodology for protecting the application keys 20 in the key escrow system 30 will be described in detail hereinbelow.

The key escrow system 30 may be incorporated into a key management system (not specifically illustrated) that generates, distributes and otherwise manages the keys 20, or it may be a standalone element of the networked computer system 10. The key management system may be a mainframe-based system, such as the Integrated Cryptographic Service Facility (ICSF) system available from IBM, or a proprietary dedicated system enabled to create and distribute keys.

Figure 2:
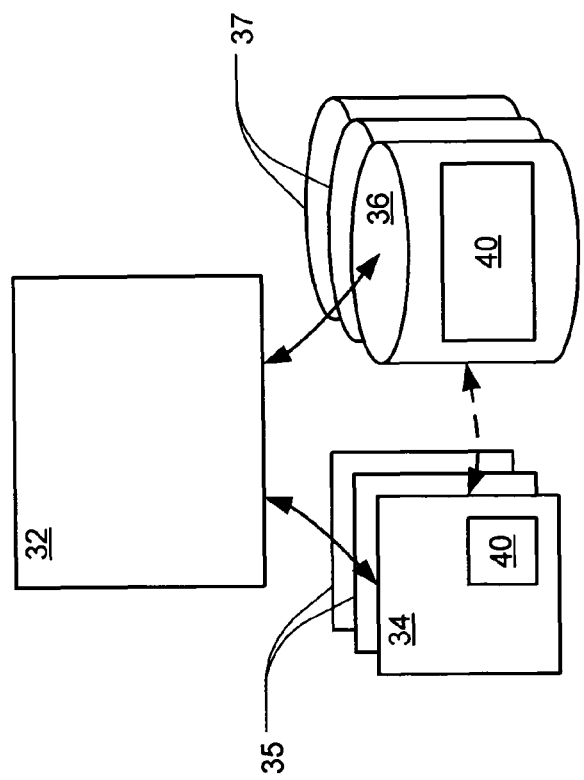
FIG. 2 is a high-level block diagram of the key escrow system of FIG. 1.
Figure 3:
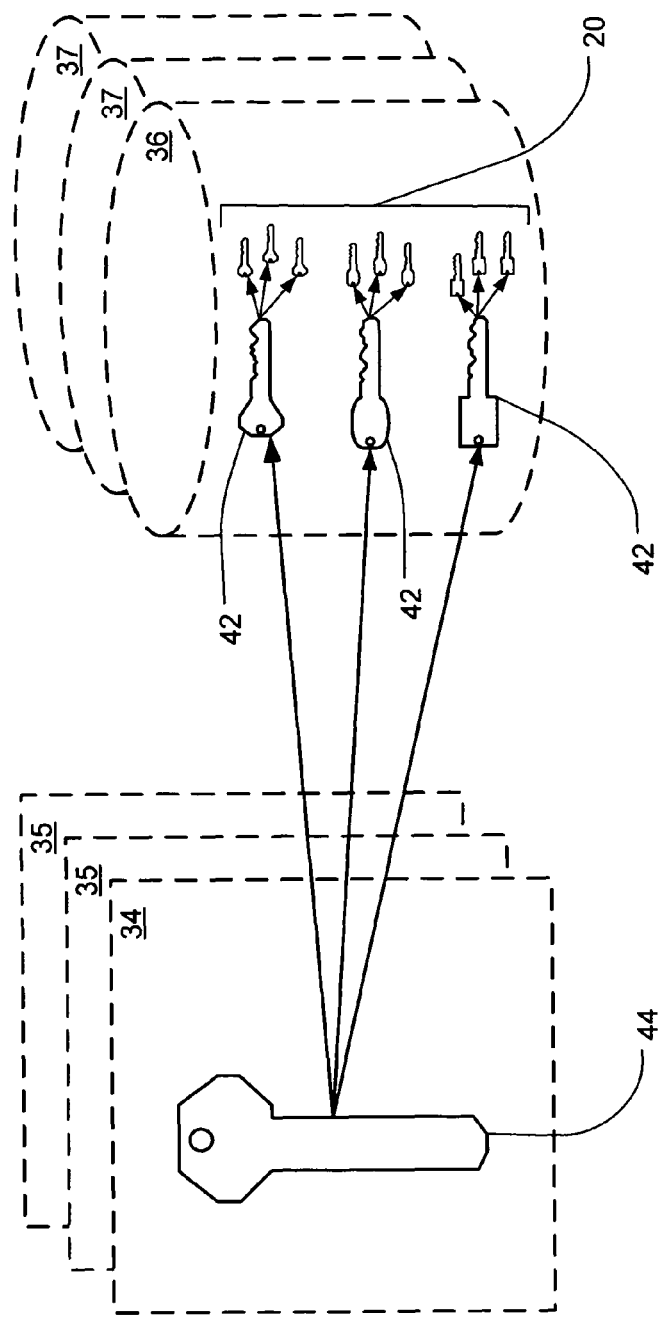
FIG. 3 is an illustration of organization of the key data of the key escrow system of FIG. 2.

FIG. 2 is a high-level block diagram of the key escrow system 30 of FIG. 1, and FIG. 3 is an illustration of organization of the key data 40 of the key escrow system 30 of FIG. 2. As is depicted, the key escrow system 30 includes a key escrow server 32, a separate, dedicated, secure hardware device 34 and a database system 36, as well as a collection of key data 40 as shown in FIG. 3. The database system 36 stores a portion of the key data 40, including the application keys 20. The key escrow server 32 is communicatively connected to the networked computer system 10 and is arranged to provide application keys 20 from the database system 36 to applications 18 within the networked computer system 10. The hardware device 34 stores another portion of the key data 40 and also houses the scrambling and descrambling functionality of the key escrow system 30. Each of these components will be described in greater detail hereinbelow.

As shown in FIG. 3, the key escrow system 30 includes a collection of key data 40 stored in the hardware device 34 and database system 36. In the embodiment depicted in FIG. 3, three types of cryptographic keys are stored in the system 30: master keys 44, intermediate keys 42 and application keys 20. Ultimately, the protection of the key escrow system 30 is created to secure the reference copies of the application keys 20. The three types of keys 20, 42, 44 are organized into three levels or layers, with a single master key 44 at the top level, the application keys 20 at a bottom level, and the intermediate keys 42 at an intermediate level. The intermediate keys 42 are used to scramble and descramble the application keys 20. In turn, the master keys 44 are used to scramble and descramble the intermediate keys 42.

As used herein, the term "level" or "layer," as applied to the keys 20, 42, 44, refers to the above-described hierarchical relationship, wherein keys 44, 42 at the higher levels are used to encrypt keys 42, 20 at the lower levels. In this regard, although only a single level or layer of intermediate keys 42 is shown, it will be apparent that additional levels or layers (not shown) of such keys 42 may likewise be incorporated into the system 30 without departing from the scope of the present invention. In that case, each level of intermediate keys 42 would be considered to be higher than those application keys 20 or intermediate keys 42, as applicable, to which they control access. Similarly, each level of intermediate keys 42 would be considered to be lower than the master key 44 and any other levels of intermediate keys 42 that control access thereto. It will be understood that although only a single level of intermediate keys 42 will generally be discussed hereinafter, the same principles of use and operation will apply should additional levels of intermediate keys 42 be included.

As illustrated, only a single master key 44 is utilized to control access to all of the other keys 42, 20. Because the master keys 44 control access to the intermediate keys 42, and ultimately the application keys 20, they require and receive a high level of protection. Use of a single master key 44 may be preferred in order to provide single-source control of all the application keys 20. However, it will be apparent that if desired, a plurality of master keys 44 may be provided, each controlling access to a subset of intermediate keys 42. This approach may be preferred if ultimate control of the keys 20 is to be separated into independent sets for some reason. Alternatively, a plurality of master keys 44 may be used for double-, triple- or other multiple layers of encryption, wherein the highest level of intermediate keys 42 are encrypted using a first master key 44 and then each encrypted intermediate key 42 is re-encrypted using a second master key (not shown), and so on. Each of the intermediate keys 42 at the highest level are thus encrypted by two or more different master keys, with the result that none of those intermediate keys 42 may be completely decrypted without the contribution of all of the master keys 44. This is one approach to solving the problem of how to distribute protection at the highest level of the key escrow system 30; another approach, which involves splitting the master key 44 into a plurality of key shares, will be described subsequently.

The secure hardware device 34 is the central control of the system and method of the present invention. It performs the scrambling and descrambling processes for the keys 20, 42, 44 of the system 10. The hardware device 34 may be defined as a peripheral computer hardware device or component that is physically isolated from other components in a system, substantially dedicated to providing cryptographic functionality as opposed to providing general purpose computer functionality, and carries out substantially all data communications using encrypted communications techniques. Because the hardware device 34 is not only limited in function, but also tamper-resistant against physical attacks including reverse-engineering, there are inherently fewer ways to access data and functionality contained therein, and thus there are fewer opportunities for the key escrow system 30 to be attacked. Such a hardware device 34 likewise is not available for general programming. All connections to and from the hardware device 34 are themselves secure in order to prevent the data processed thereby from susceptibility to attack. Exemplary hardware devices, suitable for use in the preferred embodiments of the present invention, include hardware security modules ("HSMs") offered by nCipher Corporation Ltd. or SafeNet, Inc. Such devices are well known but have previously been used only in a web page server environment and have never been used to manage application keys. As generically illustrated in FIG. 3, it is conceived that at least one back-up hardware device 35, similar in design to the primary hardware device 34, is available if the main hardware device 34 becomes disabled.

The database system 36 is utilized to store scrambled intermediate keys 42 and scrambled application keys 20. In the present application, the database system 36 may include a single database or a plurality of databases. As generically illustrated in FIGS. 2 and 3, it is also conceived that one or more back-up database systems 37, each of which is a copy of the primary database system 36, may be incorporated in order to provide availability if the primary database system 36 is disabled.

Figure 4:
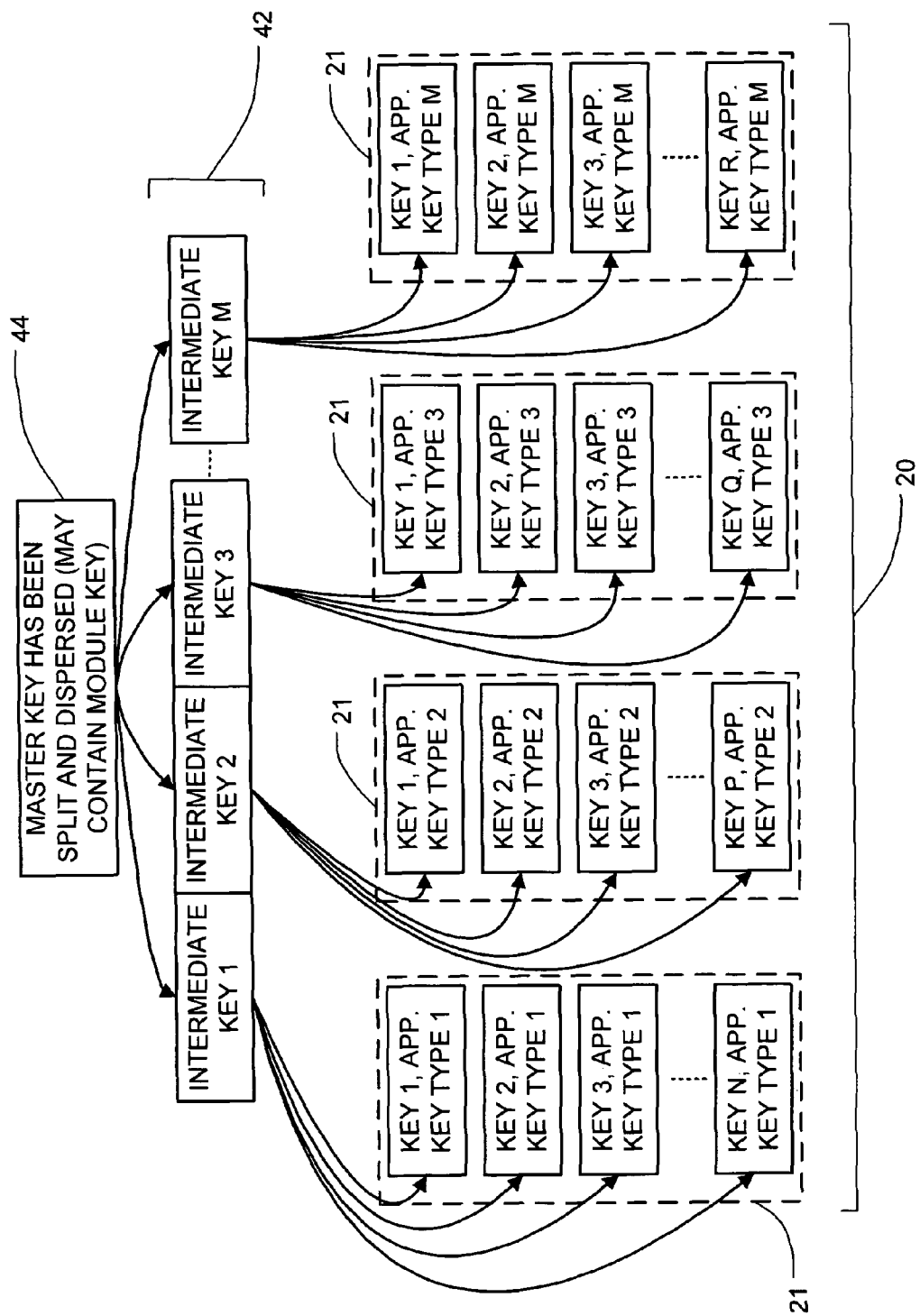
FIG. 4 is a depiction of a preferred relationship between a master key, intermediate keys and application keys in the key escrow system.

FIG. 4 depicts a preferred relationship between the master key 44, intermediate keys 42 and application keys 20 in the key escrow system 30 of the present invention. The intermediate keys 42 and application keys 20 may be stored in scrambled form in the database system 36. The number of application keys 20 stored in the database system 36 will vary depending on the complexity of the networked computer system 10 within which the key escrow system 30 is being used. As is depicted in FIG. 4, application keys 20 may be divided into groups 21 according to key type or characteristic in a manner decided by the entity operating the key escrow system 30. For example, the application keys 20 could be grouped according to the type of encryption algorithm with which they are to be used, the type of application 18 that they are being used to secure, the business unit controlling the application 18, the key length, or the like. A single intermediate key 42 will correspond to each application key group 21 and will be utilized to scramble and descramble each application key 20 within the corresponding application key group 21. In turn, the master key 44 may be used to scramble and descramble each intermediate key 42. An entity operating the key escrow system 30 may wish to implement an integrity management process whereby each of the keys in the system 30 is descrambled cyclically to verify its integrity. The schedule of the integrity management process will typically be determined by the entity operating the key escrow system 30, but conceivably could be established based on legal regulations or the like. Improved processes for verifying the integrity of the keys will be described below.

The key escrow system 30 also includes the ability to refresh or change keys at each level in a cyclical manner. The schedule of key refreshing is a determination to be made by the entity operating the key escrow system 30. For example, the operating entity may choose to refresh the application keys 20 weekly, the intermediate keys 42 monthly and the master key 44 yearly. Improved processes for refreshing the integrity of the keys will be described below.

Starting at the application key level, if an application key 20 is refreshed (i.e., replaced), the new application key 20 is scrambled using the intermediate key 42 for the group 21 to which the application key 20 belongs, and the old application key 20 is either erased or stored for historical purposes in a database for old keys. If an intermediate key 42 is refreshed, each application key 20 that was scrambled with the old intermediate key 42 is descrambled using the old intermediate key 42 and then re-scrambled using the refreshed intermediate key 42. The old intermediate key 42 is then erased or stored in the old key database. If a master key 44 is refreshed, each intermediate key 42 scrambled with the old master key 44 is descrambled using the old master key 44 and is then re-scrambled using the refreshed master key 44. The old master key 44 is either erased from the hardware device 34 or stored in the old key database. It is inherent in the system 10, as described, that refreshing keys of one key type does not require refreshing of keys of the other key types, i.e., refreshing of the master key 44 does not require refreshing the intermediate keys 42 or the application keys 20. Flexible key refreshing is an advantage of the system and method of the present invention.

Figure 5:
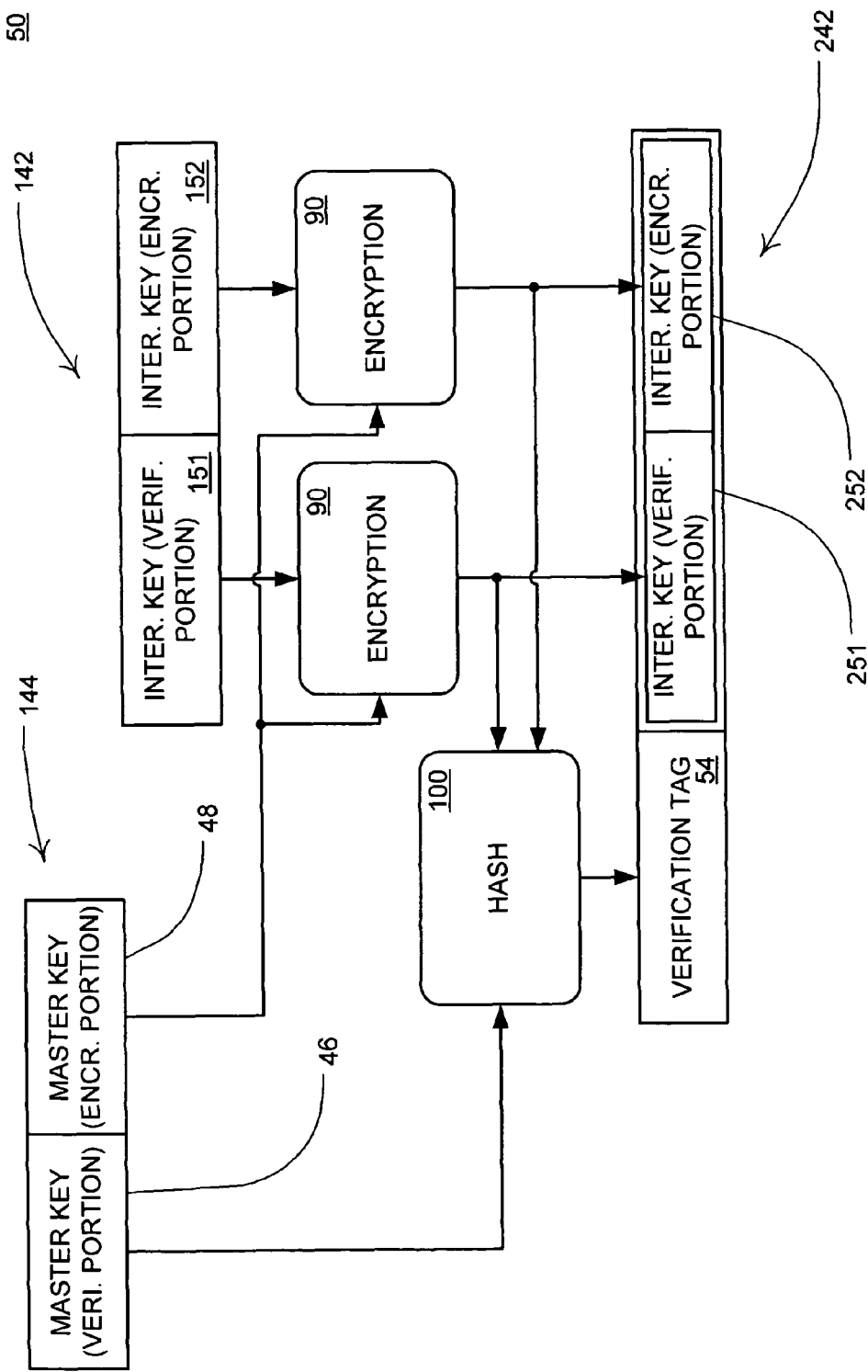
FIG. 5 is a depiction of a method of scrambling an intermediate key with the master key of the key escrow system.

FIG. 5 depicts a process 50 of scrambling an intermediate key, here referred to with reference numeral 142, with a master key, here referred to with reference numeral 144, of the system of the present invention. The basic concepts and usage of cryptographic techniques is well known to those of ordinary skill in the art. Nonetheless, a short summary of some of this information is provided herein for clarification. For purposes of the present application, scrambling means applying a cryptographic transformation process to the object of the scrambling function with the aim of concealing the content of the object from unauthorized parties. Scrambling functions are well known to those of ordinary skill in the art and include, without limitation, symmetric encryption, asymmetric encryption, hashing or any other form of cryptographic process, alone or in combination.

In the embodiments of the present invention depicted herein, the master key 44 may be a key pair comprising a symmetric encryption portion 48 and a verification portion 46. Alternatively, the master key 44 may be two key pairs comprising an asymmetric encryption key pair 154 and an asymmetric digital signature key pair 156. An intermediate key 42 may be a key pair comprising a symmetric encryption portion 152 and a verification portion 151. An application key 20 may be any number of application key types including a single key or a key pair.

Symmetric encryption involves using a single shared key among all users communicating with one another. A message is locked (encrypted) with a key and then the same key is used to unlock (decrypt) the message. In order to protect a message when using symmetric encryption, it is vital to have a secure method to exchange the secret key to all users.

Asymmetric encryption involves using a key pair to secure information. A key pair is comprised of a private key (decryption key), which is known only to a single user, and a public key (encryption key), which may be known by anyone. In order to encrypt and decrypt a message, both the private key and public key of the key pair are used. For example, a message may be encrypted by a sender using the public key of the intended recipient of the message. Once the recipient receives the encrypted message, his or her private key may be used to decrypt the message. Some asymmetric encryption algorithms also allow the use of the private key to verify the integrity of a message, i.e., act as a digital signature key. For example, a sender may use his or her private key to sign a message and then send it to a receiver. The receiver is then able to use the sender's public key to verify that the message has not been tampered with prior to receipt.

Hashing involves transforming an input message of any size into an output or hash value of another, generally smaller, size using a mathematical algorithm. The hash value is known as the message digest. The message digest is a "digital fingerprint" of the input message and serves to maintain integrity of the hashed message by allowing a recipient to verify that the message has not been tampered with since being hashed.

In the embodiment of FIG. 5, the master key pair 144 comprises a symmetric encryption portion 48 and a verification portion 46. One of ordinary skill in the art will understand that the master key pair 144 may comprise additional encryption portion/verification portion key pairs (not shown) for securing intermediate key pairs 142. For example, the master key pair 144 may comprise two key pairs, one that utilizes one method of encryption and a second that utilizes another method of encryption. The intermediate key pair 142 comprises a symmetric encryption portion 152 and a verification portion 151. More specifically, the respective symmetric encryption portions 48, 152 of the master key pair 144 and the intermediate key pair 142 may be AES keys; however, one of skill in the art will appreciate that any symmetric encryption function may be used. Symmetric encryption functions include, but are not limited to, AES, DES, 3DES, IDEA, RC5, RC6 and the like. The respective verification portions 46, 151 of the master key pair 144 and the intermediate key pair 142 are hash-based message authentication code ("HMAC") keys. One of skill in the art will appreciate that any hashing function may be used for the HMAC keys including, but not limited to, MD5, SHA-1, SHA-224, SHA-256, SHA-384 and SHA-512.

In FIG. 5, the HMAC key 151 and the AES key 152 of the intermediate key pair 142 are encrypted separately, each in an encryption process 90, using the AES key 48 of the master key pair 144. Then the encrypted HMAC key 251 and encrypted AES key 252 are combined and hashed, in a hash process 100, using the HMAC key 46 of the master key pair 144. When the encrypted intermediate key pair 242 is hashed, a hash value is generated and saved as an authentication or MAC tag 54. The MAC tag 54 may then be used to verify the integrity of the encrypted intermediate key pair 242. As further described below, performing the encryption and hashing functions 90, 100 in the described sequence allows for the encrypted intermediate key pair 242 to be verified without having to decrypt it. This capability is advantageous because it saves time, improves the efficiency and performance of a computer system and reduces the risk of key exposure.

One of skill in the art will appreciate that the hash function 100 of FIG. 5 is optional. Because the encryption and hashing functions 90, 100 are performed using two separate and functionally distinct keys or key portions of the master key pair 144, the HMAC key 151 and AES key 152 of the intermediate key pair 142 may be encrypted and hashed or may be only encrypted or only hashed. The level of protection provided for each key is determined by the entity operating the key escrow system 30.

Figure 6:
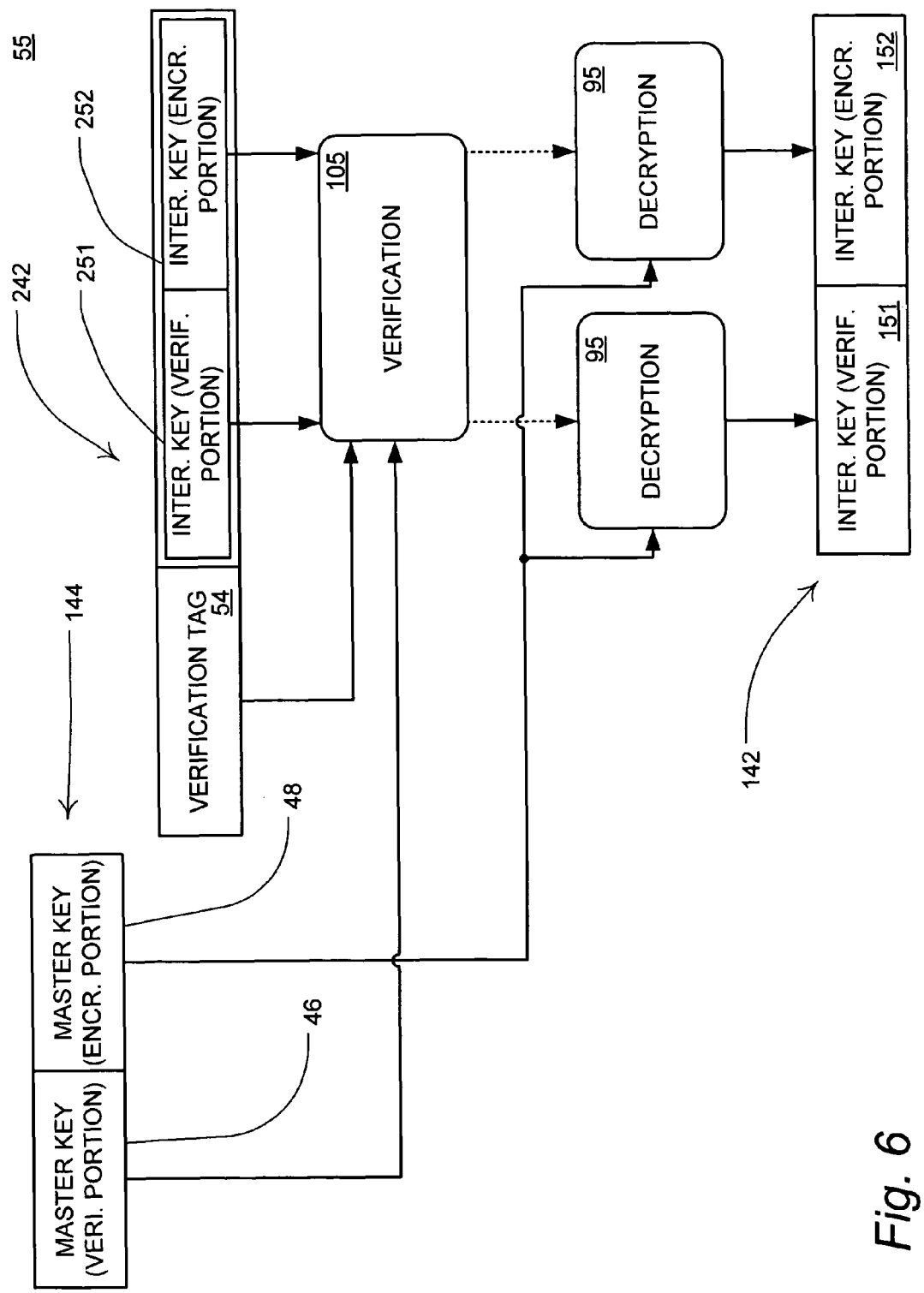
FIG. 6 is a depiction of a method of descrambling the intermediate key of FIG. 5 with the master key of FIG. 5.

FIG. 6 depicts a process 55 of descrambling the encrypted or scrambled intermediate key pair 242 of FIG. 5 with the master key pair 144 of FIG. 5. Initially, the integrity of the encrypted intermediate key pair 242 may be verified, in a verification process 105, using the HMAC key 46 of the master key pair 144 and the MAC tag 54 generated upon initial hashing 100 of the encrypted intermediate key pair 242. If the integrity is verified, decryption of the intermediate key pair 242 may proceed using a decryption process 95. If the integrity is not verified, then the key escrow system 30 will know that the intermediate key pair 242 has been somehow corrupted. Assuming that the integrity of the encrypted intermediate key pair 242 has been verified, the encrypted HMAC key 251 of the intermediate key pair 242 is decrypted, in a decryption process 95, using the AES encryption key 48 of the master key pair 144. The encrypted AES key 252 of the intermediate key pair 242 is also decrypted, in a separate decryption process 95, using the AES encryption key 48 of the master key pair 144. At this point, the entire intermediate key pair 142 is in clear text form.

It will be appreciated by one of skill in the art that encrypting the HMAC key 251 and AES key 252 of the intermediate key pair 242 separately is an advantage of the key escrow system 30 because it will allow the system 30 to decrypt one portion 251, 252 of the intermediate key pair 242 while leaving the other portion 251, 252 in encrypted form, thus saving computation time and space and providing greater security by only having one portion of the key pair 242 in clear text rather than both portions. Additionally, one of skill in the art will appreciate that in the system and method of the present invention, it is possible to hash the encrypted portions of intermediate key pair 242 separately as well. Separate hashing would generate two MAC tags (not shown) for use in integrity verification rather than one and would require separate verification for each encrypted portion 251, 252 of the intermediate key pair 242.

Figure 7:
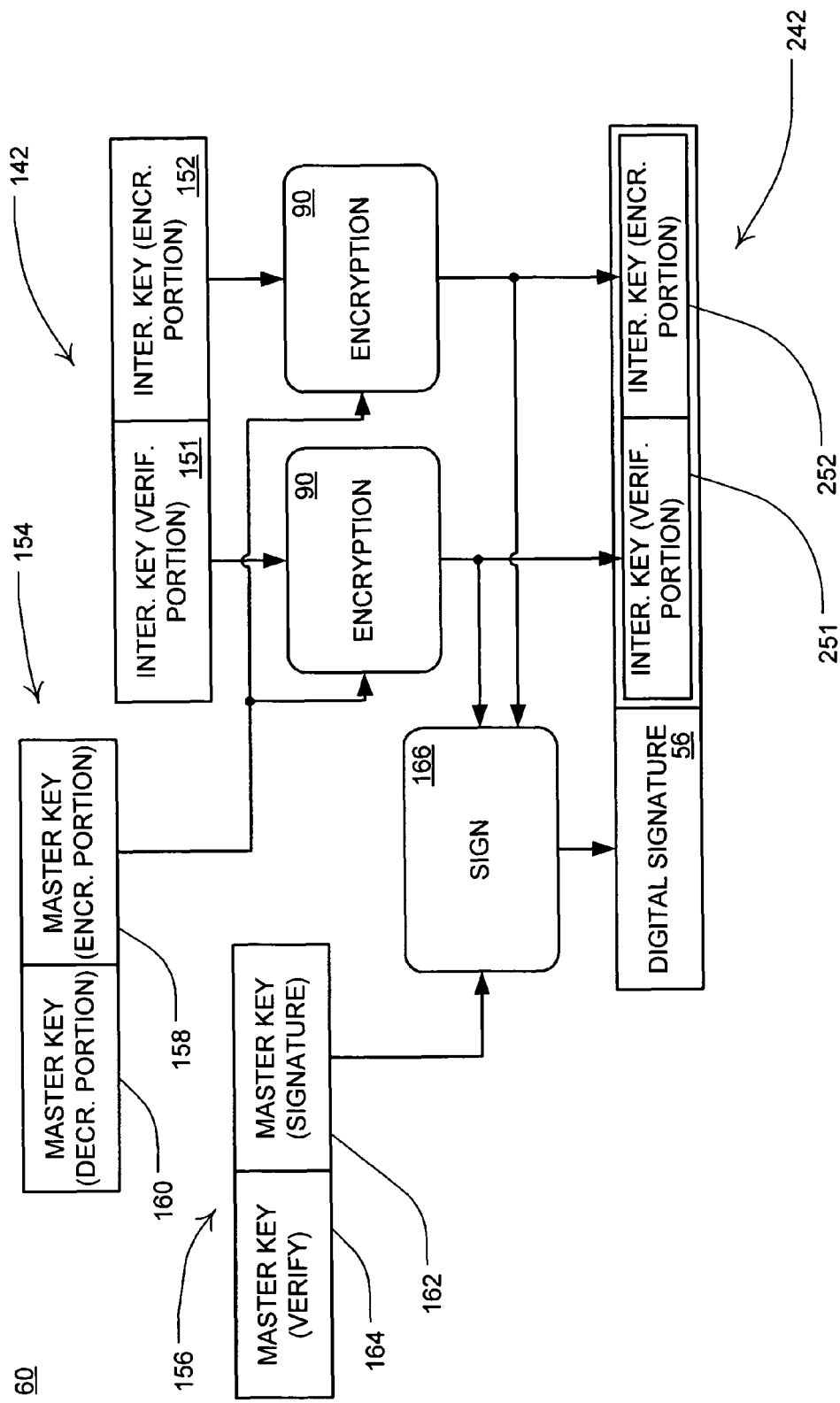
FIG. 7 is a depiction of an alternative method of scrambling an intermediate key with a master key pair.

FIG. 7 depicts an alternative process 60 of scrambling an intermediate key 142 with a pair of asymmetric master key pairs, here referred to with reference numerals 154 and 156.

In FIG. 7, the master key pairs comprise two asymmetric key pairs 154, 156, each of which has a public key portion 158, 164 and a private key portion 160, 162. The first master key pair 154 is used for encryption and decryption of the intermediate key pair 242, and the second master key pair 156 is used for digital signature generation and verification. Specifically, the master key pairs 154, 156 may comprise an RSA encryption key pair 154 and an RSA digital signature key pair 156. However, one of ordinary skill in the art will appreciate that any asymmetric encryption function and asymmetric digital signature function may be utilized. Asymmetric encryption functions include, but are not limited to, RSA, ElGamal and variants thereof and Elliptic Curve ElGamal and variants thereof. Asymmetric digital signature functions include, but are not limited to, RSA, DSA or DSS (US Digital Signature Algorithm/Standard) and ECDSA (Elliptic Curve DSA) and variants thereof One of ordinary skill will also appreciate that the two master key pairs 154, 156 may utilize different asymmetric functions, i.e., the encryption pair 154 may use RSA and the digital signature pair 156 may use DSA. The intermediate key pair 142 of FIG. 7 is the same as the intermediate key pair of FIG. 5, and includes an HMAC key 151 and an AES key 152.

In FIG. 7, the HMAC key 151 and the AES key 152 of the intermediate key pair 142 are encrypted separately, each in an encryption process 90, using the RSA encryption key 158 of the encryption master key pair 154. Then the encrypted HMAC key 251 and encrypted AES key 252 are combined and digitally signed, in a signing process 166, using the digital signature key 162 of the digital signature master key pair 156. The digital signature 156 may be used to authenticate or verify the integrity of the encrypted intermediate key pair 252.

Figure 8:
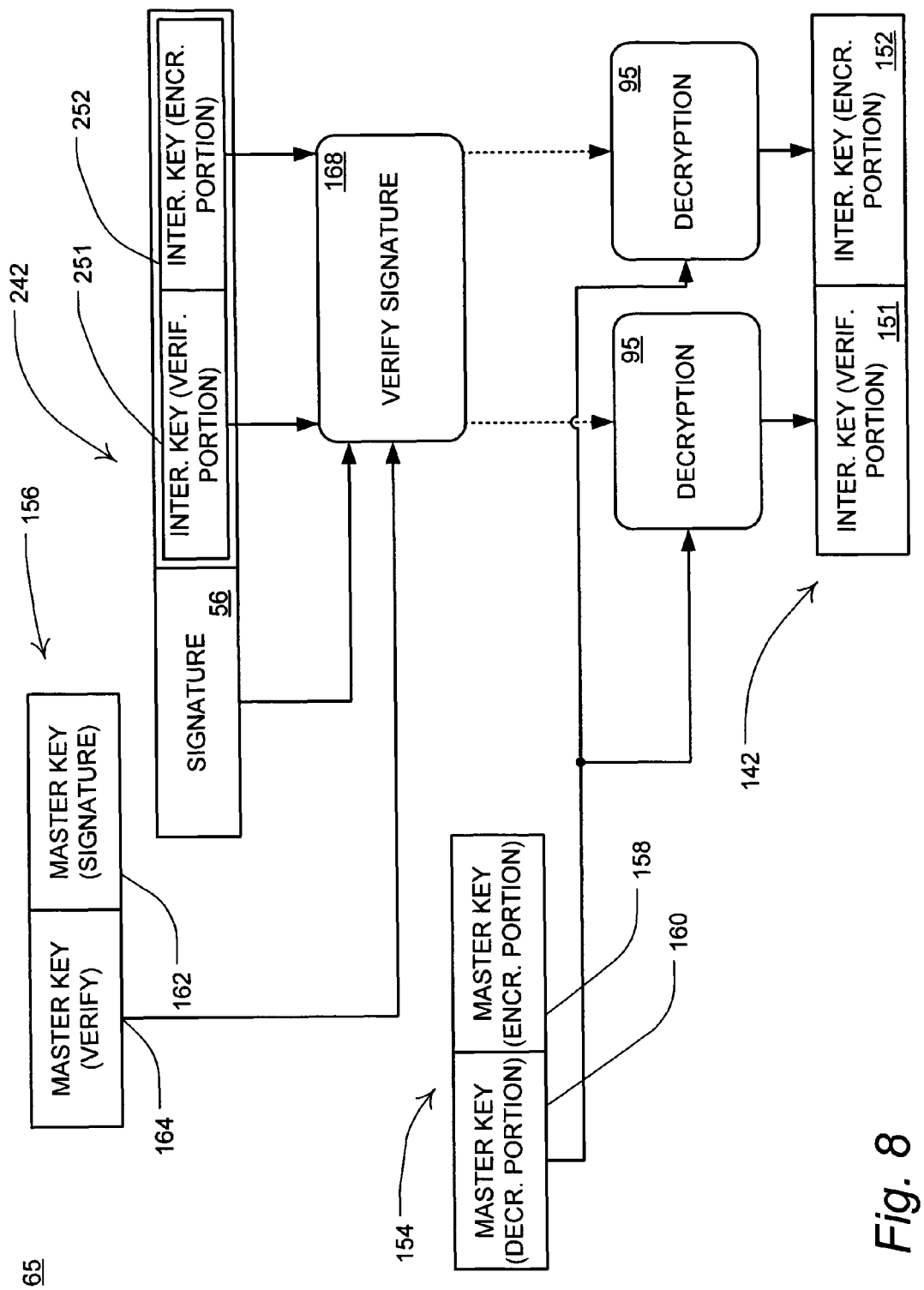
FIG. 8 is a depiction of a method of descrambling the intermediate key of FIG. 7 with the master key of FIG. 7.

FIG. 8 depicts a process 65 of descrambling the intermediate key pair 242 of FIG. 7 with the master key pairs 154, 156 of FIG. 7. Initially, the integrity of the encrypted intermediate key pair 242 may be verified, in a verification process 168, using the signature verification key 164 of the digital signature master key pair 156 and the digital signature 156 generated upon initial signing of the encrypted intermediate key pair 242. If intermediate key pair 242 integrity is verified, decryption of the intermediate key pair 242 will proceed in a decryption process 95. The encrypted HMAC key 251 of the intermediate key pair 242 is decrypted using the RSA decryption key 160 of the encryption master key pair 154. The encrypted AES key 252 of the intermediate key pair 242 is also decrypted using the RSA decryption key 160 of the encryption master key pair 154. At this point, the entire intermediate key pair 142 is in clear text form.

Figure 9:
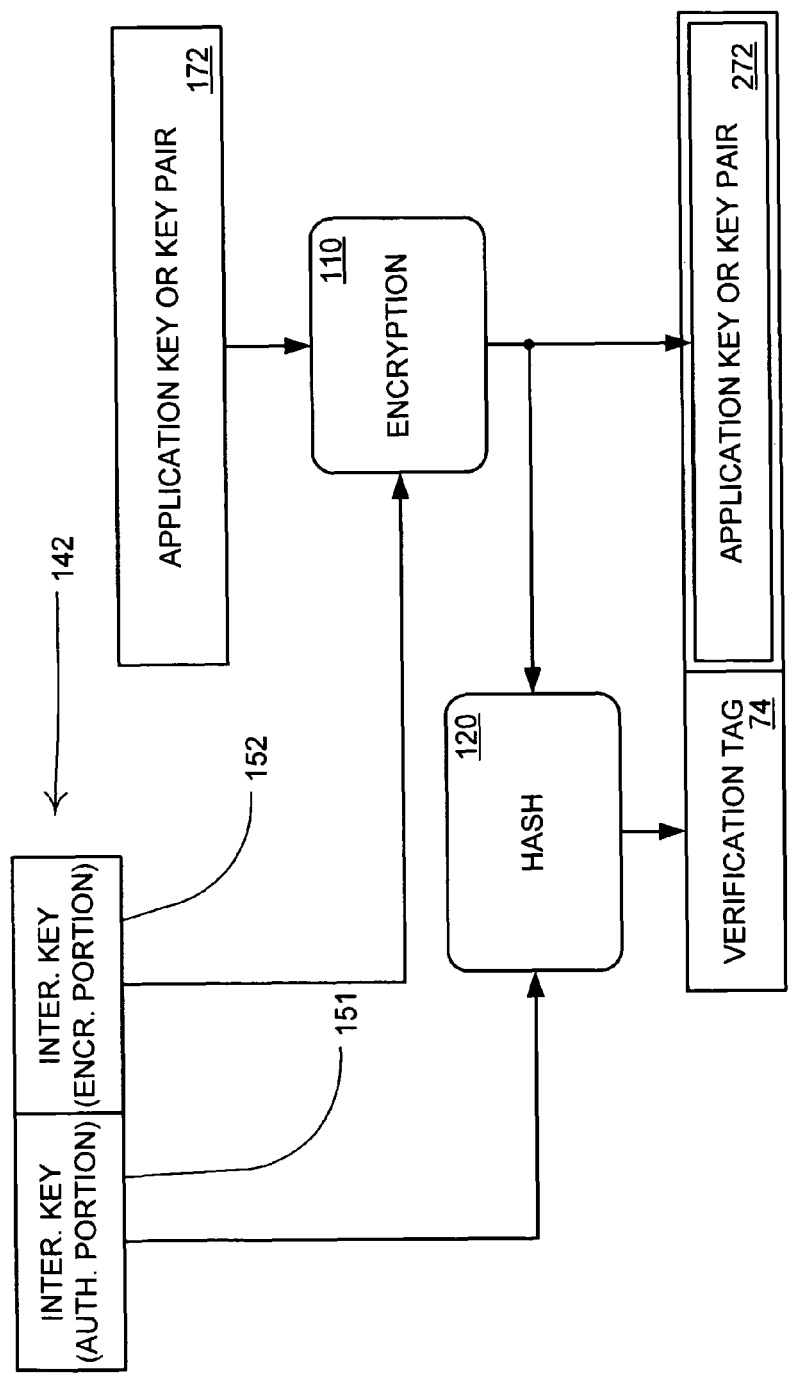
FIG. 9 is a depiction of a method of scrambling an application key with an intermediate key.

FIG. 9 depicts a process 70 of scrambling an application key, here referred to with reference numeral 172, with an intermediate key pair 142. In the embodiment depicted in FIG. 9, the intermediate key pair 142 comprises a symmetric encryption portion 152 and a hashing function portion 151. In a specific embodiment, the intermediate key pair of FIG. 9 comprises an AES key 152 and an HMAC key 151. The application key 172 of FIG. 9 represents an application key of any type. One of skill in the art will appreciate that there are numerous types of application keys, including data keys, MAC keys, certification keys, and the like. If an application key 172 is a key pair, it is scrambled as if it were a single key, i.e., both keys are encrypted together, in a single encryption process 110; rather than being encrypted separately like the intermediate key pair 142 of FIGS. 5 and 7.

Figure 10:
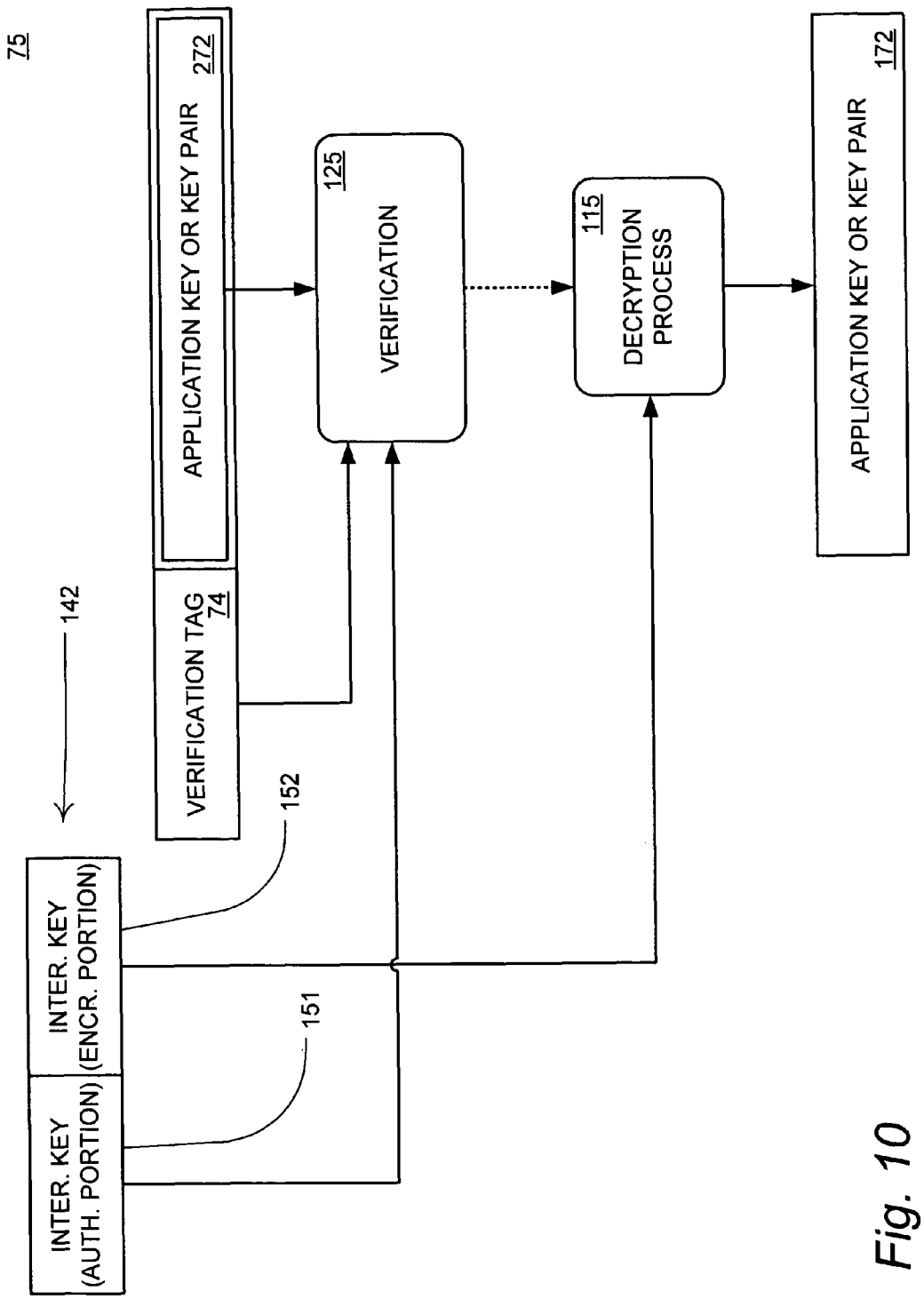
FIG. 10 is a depiction of a method of descrambling the application key of FIG. 9 with the intermediate key of FIG. 9.

As is depicted in FIG. 9, the application key 172 may be encrypted using the AES encryption key 152 of the intermediate key pair 142. The encrypted application key 272 may then be hashed, in a hash process 120, using the HMAC key 151 of the intermediate key pair 142. The hash function 120 generates a MAC tag 74, which may be used to verify the integrity of the encrypted application key 272. FIG. 10 depicts a process 75 of descrambling the application key 272 of FIG. 9 with the intermediate key pair 142 of FIG. 9. The integrity of the encrypted application key 272 may be verified, in a verification process 125, utilizing the HMAC key 151 of the intermediate key pair 142 and the MAC tag 74 generated by initial hashing of the encrypted application key 272. Then the encrypted application key 272 may be decrypted, in a decryption process 115, using the AES key 152 of the intermediate key pair 142. At this point, the application key 172 is available in clear text form.

One of ordinary skill in the art will appreciate that FIGS. 9 and 10 depict multiple scrambling and descrambling functions being performed on an application key 172, 272. Accordingly, it will be understood that an application key 172 may be encrypted and hashed, as depicted in FIG. 9, or may be only encrypted or only hashed, depending on the needs of the business operating the key escrow system 30 of the present invention.

Figure 11:
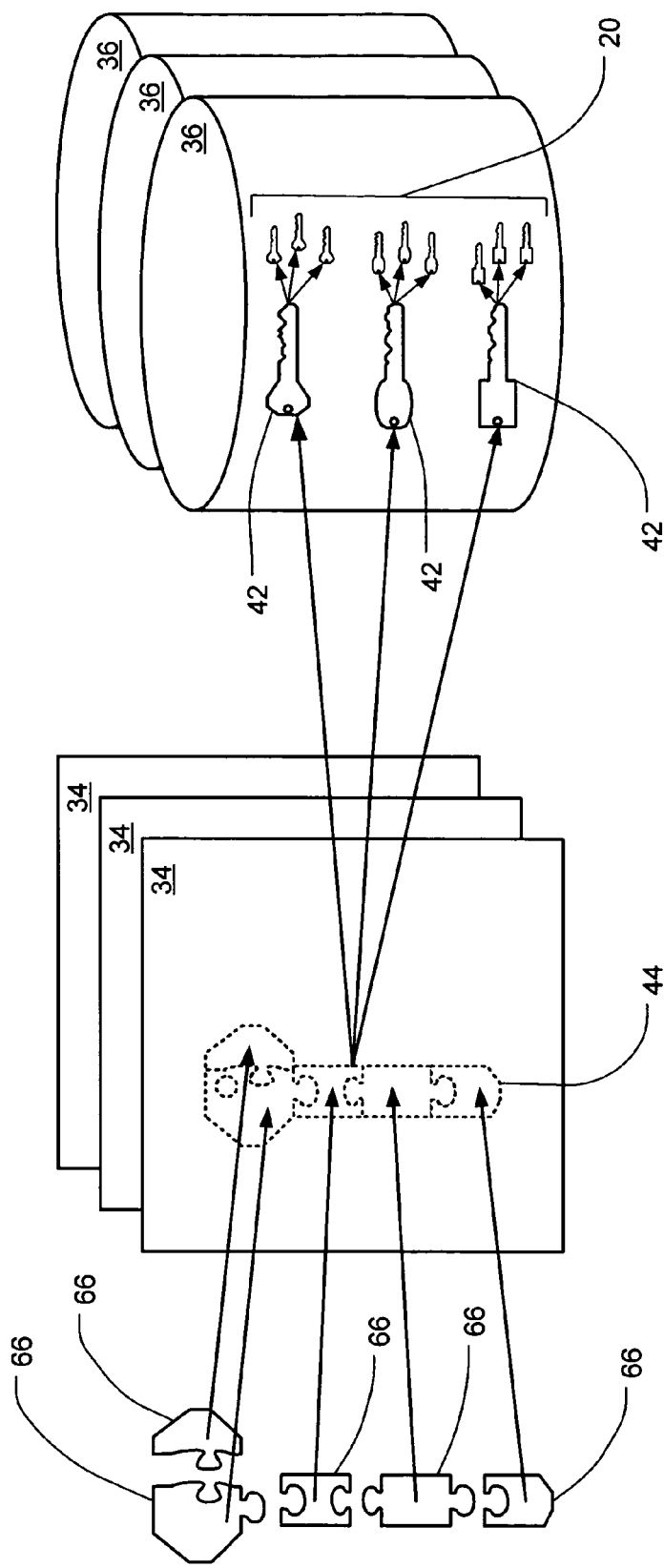
FIG. 11 is a depiction of mathematically splitting the master key into key shares for distribution to several distinct entities or devices.

The system and method of the present invention provides another aspect of protection in addition to key scrambling and tamper-proof hardware 32. FIG. 11 depicts mathematically splitting a master key 44 into key shares 66 for distribution to several distinct entities or devices. When the master key 44 is a symmetric encryption portion/verification portion key pair, the entire master key pair 44 is split and dispersed. In the embodiment wherein the master key 44 is a pair of asymmetric key pairs 154, 156, only the private decryption key portion 160 and the private digital signature generation portion 162 are split and dispersed because the encryption portion 158 and the signature verification portion 164 are already public.

By splitting the master key 44 into key shares 66, no one entity or device has access to the entire master key 44. It is conceived that an entity or device receiving a master key share 66 may secure the key share 66 in some manner, such as with password protection or via a smart card (not shown) or the like. In one embodiment, the master key 44 is in clear form when it is split into key shares 66 and the key shares 66 distributed. Once the master key 44 is split and dispersed, it is erased from the hardware device 34. In an alternative embodiment, the master key 44 is scrambled in the hardware device 34 using a module key (not shown). The scrambled master key is then split into key shares 66 and distributed. In this alternative embodiment, the module key is stored in the hardware device 34.

The hardware device 34 of the present invention has the capability to recreate or recover the master key 44 using the master key shares 66 that have been dispersed, for example, in the case of a disaster recovery scenario. In fact, the hardware device 34 may recover the master key 44 using less than all of the master key shares 66. The number of key shares 66 that the master key 44 is divided into is variable. Similarly, the number of key shares 66 needed to recreate the master key 44 is variable and may be defined or established as a portion of the total number of key shares 66 into which the master key 44 is split. An example of such a mathematical process is the so-called "t-out-of-n" threshold scheme, in which a key is split into n pieces or shares 66 in such a way that not all of the key shares need be known or available in order to recover the original key. The minimum number of key shares required is denoted as t, wherein any subset of t or more of the key shares is sufficient to recover the original key. For example, if key sharing is used for the master key 44 where n is five and t is three, the master key 44 would be split into five key shares 66 and the combination of any set of three or more key shares 66 would be sufficient to regenerate the master key 44. In determining the number of key shares 66 into which the master key 44 will be divided, the controlling entity must balance desired security with functionality, i.e., in a disaster recovery scenario, how difficult it should be to recreate a master key 44 in order to access the reference application keys 20 of the networked computer system 10.

The key escrow system 30 provides several advantages over known systems. As previously described, the system and method of the present invention utilizes diverse methods of protection for application keys 20, including scrambling, a tamper-proof hardware device 32 and key splitting. Further, the key escrow system 30 may utilize multiple methods of scrambling, including symmetric encryption, asymmetric encryption and hashing. The system 30 provides for application key grouping and flexible key refreshing. Additionally, the method of key scrambling provides for key verification that is more secure and utilizes less time and computer resources. While these advantages have been highlighted, one of ordinary skill in the art will recognize that the system and method of the present invention provides additional advantages over known systems.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to a particular embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. In a networked computer system, a method for managing stored cryptographic keys, comprising:
   (a) receiving a plurality of lower-level cryptographic keys and higher-level cryptographic keys and storing them in a database system;
   (b) in the database system, organizing the lower-level cryptographic keys into groups according to a defined characteristic;
   (c) after organizing the keys, receiving a new lower-level cryptographic key and sorting the new lower-level cryptographic key into groups according to a corresponding characteristic of the new lower-level cryptographic key;
   (d) designating a separate higher-level cryptographic key for performing scrambling and descrambling processes on lower-level cryptographic keys within each group; and
   (e) providing stored cryptographic keys in the database system to another computer in the networked computer system; and
   (f) rotating a selected one of the higher-level cryptographic keys, wherein rotating includes refreshing the selected higher-level cryptographic key, decrypting all lower-level cryptographic keys in the group associated with the selected higher-level cryptographic key and re-encrypting the lower-level cryptographic keys in the associated group with the new higher-level cryptographic key without altering the clear forms of the lower-level cryptographic keys in the associated group.

2. In a networked computer system, the method for managing stored cryptographic keys of claim 1, wherein the number of lower-level cryptographic keys is independent of the number of higher-level cryptographic keys.

3. In a networked computer system, the method for managing stored cryptographic keys of claim 1, wherein the lower-level cryptographic keys and higher-level cryptographic keys are refreshed cyclically.

4. In a networked computer system, the method for managing stored cryptographic keys of claim 1, wherein the lower-level cryptographic keys are refreshed independently of the higher-level cryptographic keys.

5. In a networked computer system, the method for managing stored cryptographic keys of claim 1, wherein the defined grouping characteristic for lower-level cryptographic keys is an encryption algorithm for which a lower-level cryptographic key is utilized.

6. In a networked computer system, the method for managing stored cryptographic keys of claim 1, wherein the defined grouping characteristic for lower-level cryptographic keys is a business unit for which a lower-level cryptographic key is utilized.

7. In a networked computer system, a method for managing and maintaining security of cryptographic keys, comprising:
   (a) providing a lower-level cryptographic key and a higher-level cryptographic key;
   (b) utilizing the higher-level cryptographic key to encrypt the lower-level cryptographic key;
   (c) rotating the higher-level cryptographic key, wherein rotating includes refreshing the higher-level cryptographic key, decrypting the lower-level cryptographic key with the higher-level cryptographic key and re-encrypting the lower-level cryptographic key with the new higher-level cryptographic key without altering the clear form of the lower-level cryptographic key; and
   (d) storing the cryptographic keys in a database system;
   (e) receiving a new lower-level cryptographic key and sorting the new lower-level cryptographic key into groups according to a corresponding characteristic of the new lower-level cryptographic key;
   (f) designating a separate higher-level cryptographic key for performing scrambling and descrambling processes on lower-level cryptographic keys within each group; and
   (g) providing the stored cryptographic keys to another computer in the networked computer system.

8. In a networked computer system, the method for managing and maintaining security of cryptographic keys of claim 7, wherein the lower-level cryptographic key is an application key and the higher-level cryptographic key is an intermediate key.

9. In a networked computer system, the method for managing and maintaining security of cryptographic keys of claim 7, wherein the lower-level cryptographic key is an intermediate key and the higher-level cryptographic key is a master key.

10. In a networked computer system, the method for managing and maintaining security of cryptographic keys of claim 7, wherein the lower-level cryptographic key is a first intermediate key and the higher-level cryptographic key is a second intermediate key.

11. In a networked computer system, the method for managing and maintaining security of cryptographic keys of claim 7, wherein the higher-level cryptographic key is automatically rotated cyclically.

12. A secure key escrow system for application keys within a networked computer system, comprising:
   (a) a collection of key data, the key data including a plurality of application keys, at least one level of intermediate keys and a master key, the application keys for use in facilitating secure communication in the networked computer system, wherein each application key is encrypted using a key from the lowest of the at least one level of intermediate keys, and each key in the highest of the at least one level of intermediate keys is encrypted using the master key;
   (b) a cryptographic key database system that stores the encrypted application keys and each key from at least the lowest level of intermediate keys;
   (c) a server computer communicatively connected into the networked computer system and arranged to provide application keys from the database system to other computers in the networked computer system; and
   (d) a peripheral hardware security module communicatively connected to the server computer that encrypts each application key using a key from the lowest level of the at least one level of intermediate keys and encrypts each intermediate key from the highest level of the at least one level of intermediate keys with the master key, wherein the collection of key data includes a separate verification tag associated with each encrypted application key and encrypted intermediate key, each separate verification tag associated with an encrypted application key being generated using a key from the lowest of the at least one level of intermediate keys, each separate verification tag associated with an intermediate key in the highest of the at least one level of intermediate keys being generated using the master key.

13. The secure key escrow system for application keys within a networked computer system of claim 12, wherein there is one key at each level of the at least one level of intermediate keys.

14. The secure key escrow system for application keys within a networked computer system of claim 12, wherein the lowest level of the at least one level of intermediate keys and the highest level of the at least one level of intermediate keys are the same level.

15. The secure key escrow system for application keys within a networked computer system of claim 14, wherein there is one key at each level of the at least one level of intermediate keys.

16. The secure key escrow system for application keys within a networked computer system of claim 12, wherein the database system includes a first database housing the encrypted application keys and each key from at least the lowest level of intermediate keys, and a second database mirroring the first database.

17. The secure key escrow system for application keys within a networked computer system of claim 12, further comprising a second peripheral hardware security module adapted to perform the same functionality as the first peripheral hardware security module and using the same master key for backup.

18. The secure key escrow system for application keys within a networked computer system of claim 12, further comprising a plurality of master key shares, the plurality of master key shares being generated by mathematically splitting the master key.

19. The secure key escrow system for application keys within a networked computer system of claim 18, wherein each of the plurality of master key shares is stored on a portable device.

20. The secure key escrow system for application keys within a networked computer system of claim 19, wherein each portable device is password protected.

21. A method for operating a secure key escrow system for application keys within a networked computer system, comprising:
(a) collecting key data, the key data including a plurality of application keys, at least one level of intermediate keys and a master key, the application keys for use in facilitating secure communication in the networked computer system, wherein each application key is encrypted using a key from the lowest of the at least one level of intermediate keys, and each key in the highest of the at least one level of intermediate keys is encrypted using the master key;
(b) utilizing a cryptographic key database system, storing encrypted application keys and each key from at least the lowest level of intermediate keys in a database system;
(c) utilizing a server computer communicatively connected with the networked computer system, providing application keys from the database system to other computers in the networked computer system; and
(d) utilizing a peripheral hardware security module communicatively connected to the server computer, encrypting each application key using a key from the lowest level of the at least one level of intermediate keys and encrypting each intermediate key from the highest level of the at least one level of intermediate keys with the master key, wherein the key data collected includes a separate verification tag associated with each encrypted application key and encrypted intermediate key, each separate verification tag associated with an encrypted application key being generated using a key from the lowest of the at least one level of intermediate keys, each separate verification tag associated with an intermediate key in the highest of the at least one level of intermediate keys being generated using the master key.

22. The method for operating a secure key escrow system for application keys within a networked computer system of claim 21, further comprising: utilizing a mathematical algorithm, splitting the master key into a plurality of master key shares.

23. The method for operating a secure key escrow system for application keys within a networked computer system of claim 22, further comprising: storing each master key share on a portable device and distributing each portable device to an entity.

24. The method for operating a secure key escrow system for application keys within a networked computer system of claim 23, further comprising: utilizing the peripheral hardware security module, reconstructing the master key from the plurality of master key shares.

25. The method for operating a secure key escrow system for application keys within a networked computer system of claim 24, wherein less than all of the plurality of master key shares are utilized to reconstruct the master key.

26. A method for operating a secure key escrow system for application keys within a networked computer system, comprising:
(a) collecting key data, the key data including a plurality of application keys, at least one level of intermediate keys and a master key, the application keys for use in facilitating secure communication in the networked computer system, wherein each application key is encrypted using a key from the lowest of the at least one level of intermediate keys, and each key in the highest of the at least one level of intermediate keys is encrypted using the master key;
(b) utilizing a cryptographic key database system, storing encrypted application keys and each key from at least the lowest level of intermediate keys in a database system;
(c) utilizing a server computer communicatively connected with the networked computer system, providing application keys from the database system to other computers in the networked computer system;
(d) utilizing a peripheral hardware security module communicatively connected to the server computer, encrypting each application key using a key from the lowest level of the at least one level of intermediate keys and encrypting each intermediate key from the highest level of the at least one level of intermediate keys with the master key, wherein the key data collected includes a separate verification tag associated with each encrypted application key and encrypted intermediate key, each separate verification tag associated with an encrypted application key being generated using a key from the lowest of the at least one level of intermediate keys, each separate verification tag associated with an intermediate key in the highest of the at least one level of intermediate keys being generated using the master key; and
(e) utilizing a mathematical algorithm, splitting the master key into a plurality of master key shares.

27. The method for operating a secure key escrow system for application keys within a networked computer system of claim 26, further comprising storing each master key share on a portable device and distributing each portable device to an entity.

28. The method for operating a secure key escrow system for application keys within a networked computer system of claim 27, further comprising utilizing the peripheral hardware security module, reconstructing the master key from the plurality of master key shares.

29. The method for operating a secure key escrow system for application keys within a networked computer system of claim 28, wherein less than all of the plurality of master key shares are utilized to reconstruct the master key.

* * * * *